R. F. KNIGHT.
MOLD AND METHOD OF MAKING SAME.
APPLICATION FILED FEB. 26, 1920.

1,419,972.

Patented June 20, 1922.
2 SHEETS—SHEET 1.

INVENTOR.
Ralph F. Knight
By his Attorney.
Nelson W. Howard

R. F. KNIGHT.
MOLD AND METHOD OF MAKING SAME.
APPLICATION FILED FEB. 26, 1920.

1,419,972.

Patented June 20, 1922.

INVENTOR
Ralph F. Knight
By his Attorney

UNITED STATES PATENT OFFICE.

RALPH F. KNIGHT, OF BEVERLY, MASSACHUSETTS, ASSIGNOR TO UNITED SHOE MACHINERY CORPORATION, OF PATERSON, NEW JERSEY, A CORPORATION OF NEW JERSEY.

MOLD AND METHOD OF MAKING SAME.

1,419,972.

Specification of Letters Patent. Patented June 20, 1922.

Application filed February 26, 1920. Serial No. 361,425.

*To all whom it may concern:*

Be it known that I, RALPH F. KNIGHT, a citizen of the United States, residing at Beverly, in the county of Essex and State of Massachusetts, have invented certain Improvements in Molds and Methods of Making Same, of which the following description, in connection with the accompanying drawings, is a specification, like reference characters on the drawings indicating like parts in the several figures.

The present invention relates to the manufacture of soles of rubber or rubber compound, hereinafter referred to as rubber.

A rubber sole which is incorporated in a turn shoe has formed on one face thereof a rib to which the upper is sewed, said rib extending entirely around the sole in the case of shoes having sewed heel seats and along the forepart and shank in the case of shoes having nailed seats. Hitherto it has been customary to cast the two sections of the molds which are used to mold and vulcanize such soles. The molds thus produced and the method of producing them, however, are subject to certain disadvantages. Among other disadvantages the following may be noted. In order to give strength to such cast molds so that they may withstand the pressure to which they are subjected during use, it is necessary, or at least desirable, to fasten to their sections steel backing plates. Again the operation of casting iron or other inexpensive materials is in general a rough one, and in the case of these molds, it is usually necessary to perform more or less machine work upon them and particularly to machine the groove by which the sewing rib of the rubber sole is formed.

In order to provide a mold of the type being discussed which is to be subjected to considerable heat and pressure and in which the stock contacting surfaces should be smooth and accurately shaped, it is desirable to use a strong, close grained metal such as steel. To cut the sections of the mold from steel or other strong, close-grained metal by a routing process and particularly to cut the rib-forming groove accurately is, however, both difficult and expensive.

A general object of the present invention is to provide an economically constructed and durable mold by means of which rubber articles having correctly shaped ribbed portions may be formed and vulcanized and then readily freed from the mold.

With this object in view, the invention in one of its aspects comprises a mold member consisting of two plates secured together, one of said plates having a rib-forming slot extending entirely through it and the other plate being firmly secured to the slotted plate and seamlessly closing said slot to convert it into a groove.

In another aspect, the invention comprises the method of making such a mold member which consists in slotting a metal plate and then seamlessly closing that part of the slot which opens at one side of the plate. This enables the height of the rib, when the rubber sole is molded, to be determined by the thickness of the plate through which said slot is formed, all of which will be explained more fully hereinafter.

In accordance with these features of the invention, I provide mold members economically made in quantities preferably from sheet steel of standard thickness, which thickness determines the height of the rib formed on the molded article, as will be apparent from the following description when considered in connection with the acccompanying drawings in which, Fig. 1 is a plan view of a flat plate of the desired thickness which is to be employed in the making of one member of the compound mold, which plate has etched upon it, or otherwise indicated, the pattern or form of the rib of a shoe sole which is to be molded;

Figure 6:
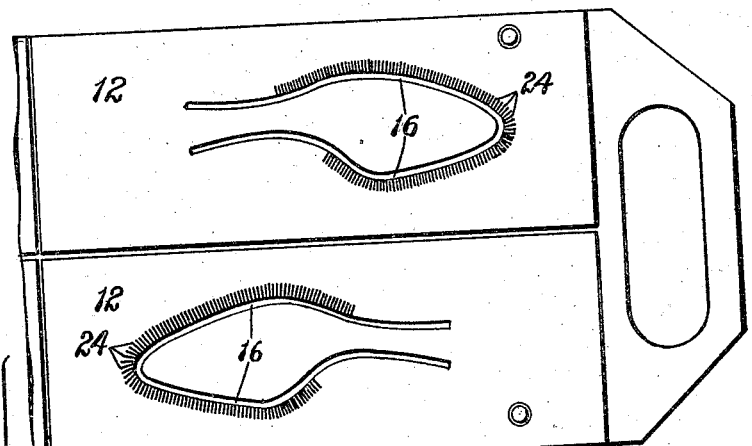
Fig. 6 is a plan view of the co-operating mold members ready for the making of ribbed rubber soles.
Figure 7:
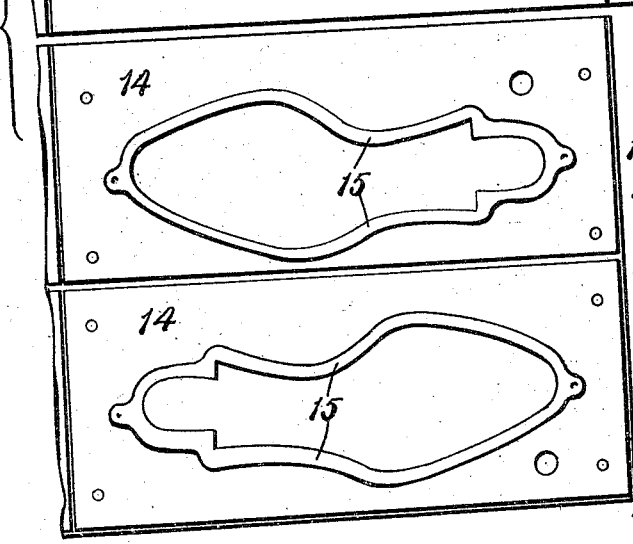
Fig. 7 is a detail sectional view illustrating how the mold members are related when a ribbed sole is to be formed.
Figure 7:
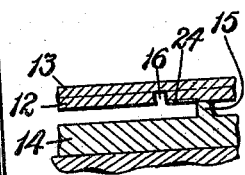

The two members of a complete mold are indicated in Fig. 7, the same consisting of an upper member comprising two plates 12, 13, the other member 14 having a wall 15 which may have the shape in plan indicated in Fig. 6. This lower mold member 14 may be cast or otherwise formed, or it may be produced in a manner similar to that presently described in connection with the upper member 12, 13. The wall 15 of the member 14 supplies a boundary to give shape to the edge of the sole molded between said upper and lower members.

Figure 1:
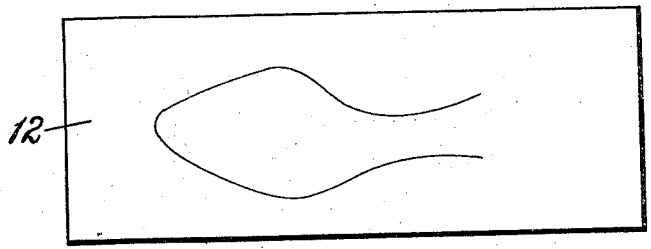
Figures 2, 3:
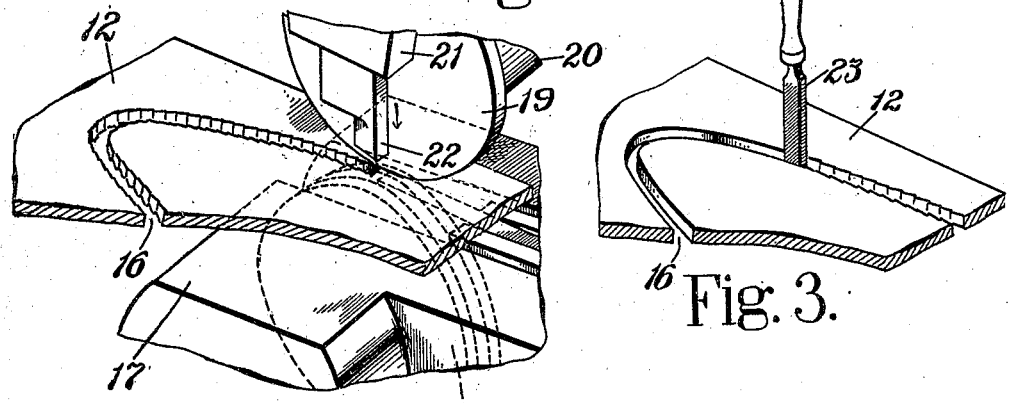
Fig. 2 is a fragmentary, broken-out perspective illustration of one step of the method of making one of the mold members.
Fig. 3 is a similar view illustrating another step of the method.

To manufacture the upper mold member I first take a plate 12 of a suitable high-grade metal such as steel, the same being smooth and of uniform thickness, and on one surface thereof mark such an outline as indicated in Fig. 1, which outline may be formed by a scratching tool drawn around the edge of a pattern laid upon the plate 12. The plate is then slotted by suitable means such as indicated in Fig. 2, said means comprising a table or support 17 on which the plate 12 may be shifted around by the operator, the plate being fed preferably by suitable means such as lower and upper feed wheels 18, 19, one of which is driven by a shaft 20. Mounted to reciprocate in a portion 21 of the frame or head of the machine is a punch 22. When the plate 12 is mounted upon the table 17 and the machine is in operation, the operator can suitably guide the plate so that the punch 22 will form a slot 16 in the plate by successive punching operations. The walls of the slot 16 may then be made smooth by means of any suitable machine or tool such as a file 23 indicated in Fig. 3.

In order that the customary stitch indentations may be borne by the sole to be molded, the mold is provided with serrations such as indicated at 24. To indent the plate 12 to produce the serrations 24, said plate is next subjected to the action of a chisel 25 (Fig. 4) operated by a plunger 26 mounted to reciprocate in a block 27, said block having a finger 28 adapted to engage one wall of the slot 16 in the plate 12. To control the proper spacing of the notching chisel 25, the block is provided with an adjustable finger 29 so positioned that the operator can conveniently locate the end of said finger 29 in each of the last-formed notches just prior to actuation of the plunger 26 to cause the chisel 25 to form the next notch.

Figure 4:
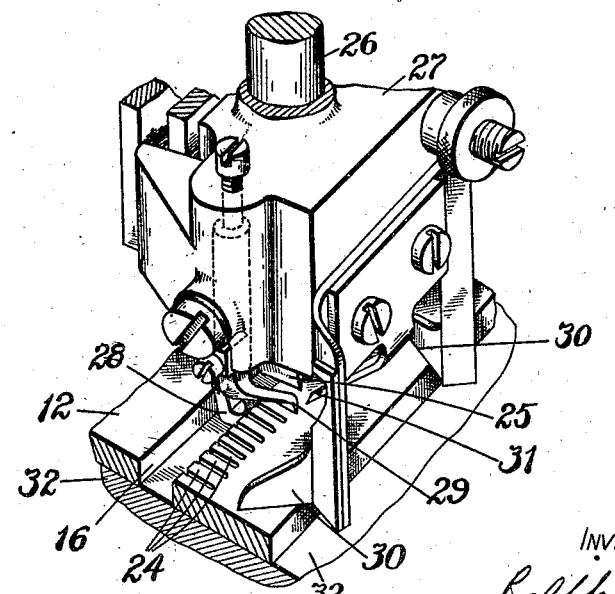
Fig. 4 is a similar view illustrating how certain serrations may be made in the mold member referred to above.

The block 27 is provided with suitable feet 30 to rest upon the surface of the plate 12, a pointer 31 being also carried by the block to indicate to the operator just where the edge of the chisel 25 will descend upon the plate 12. In carrying out this step of the method by means of such a tool or device as shown in Fig. 4, the plate 12 is mounted upon a suitable table 32 and by relative movements of the plate 12 and block 27 during a succession of operations of the chisel 25, a succession of notches 24 may be formed in the surface of plate 12 adjacent the slot 16, uniformity of said notches being obtained by means of the controlling finger 29 and the guide finger 28.

Figure 5:
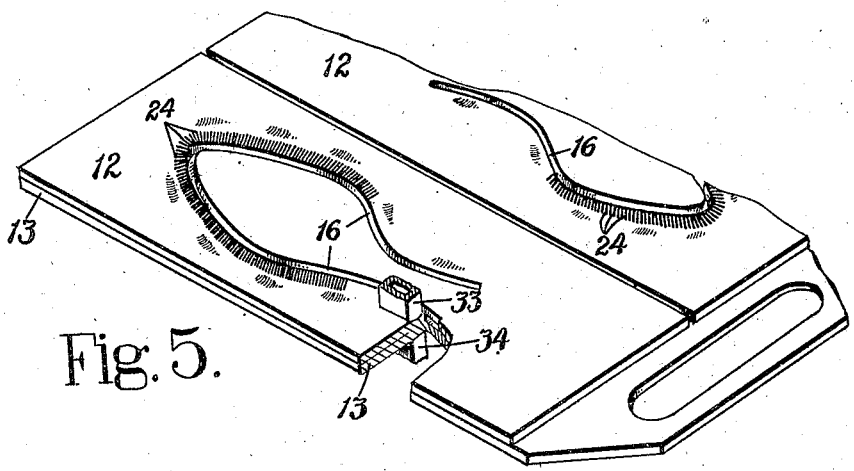
Fig. 5 is a perspective view illustrating another step of making the mold member.

The next step of the method consists in seamlessly closing that part of the slot which opens at one side of the plate. In the present embodiment of the invention I permanently secure to that face of the plate 12 opposite the face which has the serrations 24 another plate 13. To connect the two plates 12, 13, so that there can be no exudation of rubber from the bottom of the groove resulting from closing the slot 16, I preferably employ a method of autogenous soldering such as electric welding. In Fig. 5 I conventionally illustrate the two members 33, 34 of a suitable electric welding mechanism. The operator, after assembling the plates 12, 13 which latter may be large enough to carry several plates 12 as indicated in Figs. 5 and 6, moves the assembled plates relatively to the members 33, 34 (or moves the latter relatively to the plates) so as to weld the plates 12, 13 together along those portions which are adjacent to each side of the cavity 16, thereby seamlessly closing what now constitutes the bottom of the rib-forming groove.

It will now be understood that I am able to manufacture rapidly and economically the mold members indicated in Figs. 5, 6 and 7, the upper mold member having a rib-forming groove of uniform width throughout and of uniform depth, said depth being determined by the thickness of the steel plate 12.

Having thus described my invention, what I claim as new and desire to secure by Letters Patent of the United States is:

1. As a new article of manufacture, a two-member mold for the manufacture of rubber soles having sewing ribs, one of the members having a sole-edge-forming wall and the other member comprising two superposed plates permanently united, one of the plates having a slot extending through it so as to form with the exposed surface of the other plate a rib-forming groove.

2. Means for molding ribbed material comprising two co-operating mold members, one having a sole-shaped recess and the other comprising two plates one of which is of a thickness corresponding to the height of the rib to be formed on the article, the latter plate having a rib-forming slot, and the other plate closing that part of the slot which opens at one side of the slotted plate so as to convert the slot into a rib-molding groove.

3. The method of producing co-operating mold members for use in molding and vulcanizing ribbed rubber soles which comprises making one of the members with a cavity bounded by a wall the contour of which determines the contour of the edge of the sole, and making the other member from two plates by first cutting through one plate a slot having the shape desired for the rib of the sole and then attaching a second plate to the first in such manner as to convert the slot into a rib-forming groove.

4. The method of producing co-operating mold members for use in molding and vulcanizing ribbed rubber soles which comprises marking one of the members with a cavity bounded by a wall the contour of which determines the contour of the edge of the sole, and making the other member from two plates by first cutting through one plate a slot having the shape desired for the rib of the sole and then welding a second plate to the first in such manner as to convert the slot into a rib-forming groove.

5. That improvement in the art of making a grooved mold member for use in molding and vulcanizing ribbed rubber soles, which consists in providing a metal plate with a slot having the shape which is desired for the rib of the sole to be molded and vulcanized, and then seamlessly closing that part of the slot which opens at one side of the plate so as to produce a rib-forming groove.

6. That improvement in the art of making a grooved mold member for use in molding and vulcanizing ribbed rubber articles, which consists in applying a pattern outline to a metal plate of the desired thickness, slotting the plate along said outline, and then seamlessly closing that part of the slot which opens at one side of the plate.

In testimony whereof I have signed my name to this specification.

RALPH F. KNIGHT.